US Patent [19]  
Self

[11] Patent Number: 5,032,630  
[45] Date of Patent: Jul. 16, 1991

[54] REACTIVE EXTENDERS FOR UNSATURATED POLYESTER RESIN SYRUPS

[75] Inventor: James M. Self, Taylors, S.C.

[73] Assignee: ABCO Industries, Ltd., Roebuck, S.C.

[21] Appl. No.: 360,269

[22] Filed: Jun. 2, 1989

[51] Int. Cl.[5] ............................................. C08K 3/26
[52] U.S. Cl. ................................... 523/501; 523/505; 523/514
[58] Field of Search ................. 523/501, 505, 514; 524/787, 788; 525/29

[56] References Cited

U.S. PATENT DOCUMENTS

| | | | |
|---|---|---|---|
| 3,978,018 | 8/1976 | Self | 523/505 |
| 4,011,195 | 3/1977 | Self | 523/505 |
| 4,061,613 | 12/1977 | Self | 523/505 |
| 4,061,614 | 12/1977 | Self | 523/505 |

Primary Examiner—Lewis T. Jacobs
Attorney, Agent, or Firm—Dority & Manning

[57] ABSTRACT

An improved polymerizable composition for molding and the like including a monomer composition capable of free radical polymerization, a reactive extender which is a stabilized reaction product of an alkali metal silicate and a water soluble, unsaturated carboxylic acid and an inorganic filler, at least part of which includes a group II metal carbonate. The reactive extender and the process for producing same are also claimed.

12 Claims, No Drawings

REACTIVE EXTENDERS FOR UNSATURATED POLYESTER RESIN SYRUPS

FIELD OF THE INVENTION

This invention relates to polymerizable, unsaturated polyester resin syrup compositions and reactive extenders for use therewith and the thermoset products prepared therefrom.

BACKGROUND OF THE INVENTION

Unsaturated polyester resin syrups are employed in the production of coatings, molded casts and hand lay-up products such as building sheets, automobile fenders, furniture, plumbing fixtures, tub/shower stall units, ductwork, boats, electrical component housings, electrical circuit boards and the like.

It is known in the art that a wide variety of extenders may be incorporated into an unsaturated polyester resin syrup composition. A particular extender material selected is generally dependent upon a number of considerations including strength, flammability, texture, cost, etc. For example, in applicant's prior U.S. Pat. No. 3,978,018, an aqueous alkali stabilized colloidal silica and other reinforcing and non-reinforcing extender materials are disclosed for addition to a resin syrup to obtain a composition which possesses a low fuel content and a low flame spread.

In applicant's U.S. Pat. Nos. 4,011,195 and 4,013,614, a composition which also possesses a low fuel content and a low flame spread is obtained by adding an aqueous alkali metal silicate and other reinforcing and non-reinforcing extender materials to an unsaturated polyester resin syrup.

In applicant's U.S. Pat. Nos. 4,192,791, 4,347,331 and 4,402,633, aluminum compounds are employed as extenders for unsaturated polyester resin syrups.

However, increases in viscosity upon the addition of prior art extenders has heretofore precluded sprayability. The composition of the present invention provides an economical extender for use with unsaturated polyester resin syrups with limited viscosity increase. The reactive extender according to the present invention also affords improved process conditions for use of same leading to improved products.

SUMMARY OF THE INVENTION

It is an object of the present invention to provide a reactive extender for use in free radical polymerization reactions.

It is another object of the present invention to provide a reactive extender for use with unsaturated polyester resin syrups.

It is a further object of the present invention to provide an economical means for extending polyester resins.

It is still another object of the present invention to provide an economical means for the production of a highly fire-resistant end product.

It is yet another object of the present invention to provide an extending composition for use with unsaturated polyester resin syrups which yields a highly uniform laminate end product.

It is another object of the present invention to provide a reactive extender for use with unsaturated polyester resins which exhibits a cure cycle comparable in length to that of a conventional unsaturated polyester resin syrup.

It is yet another object of the present invention to provide a reactive extender for use with unsaturated polyester resins providing an extended pull window during which shaped objects which have not completely cured may be pulled from a mold without cracking.

These as well as other objects are achieved by providing a process for making a reactive extender for use with unsaturated polyester resin syrups which comprises preparing an aqueous alkali metal silicate solution, preparing an aqueous solution of a water soluble unsaturated carboxylic acid, slowly adding a generally stoichiometric amount of the carboxylic acid solution to the aqueous alkali metal silicate solution while mixing at a high shear adequate to break hydrous silica gel particles formed by the reaction of the alkali metal silicate with the carboxylic acid with the pH of the resultant solution being within the range of 4 to 10 and adding a sufficient amount of a thickener to maintain the hydrous silica gel particles in suspension and achieve a viscosity suitable for spraying.

A polymerizable composition is obtained by mixing about 20 percent to 50 percent by weight of the reactive extender prepared according to the present invention with about 20 percent to about 50 percent by weight of a unsaturated polyester resin syrup and at least about 10 percent by weight of a group II metal carbonate filler. Conventional fillers also including the group II metal carbonates may also be added up to about a 70 percent by weight total filler content.

DESCRIPTION OF PREFERRED EMBODIMENTS

The present invention is directed to the preparation of thermoset products from unsaturated polyester resin syrup compositions. It has been found that by extending the polyester resin with an acrylic modified inorganic binder, an improved product is achieved through an easier and more economical process. As discussed above, it is well known in the art to add extenders to unsaturated polyester resins in order to decrease costs and increase flame retardance. The present process more economically achieves the goals of the prior art through the use of an extender which additionally allows for the control of viscosity. The prior art has typically focused on inorganic binders which produce substantial increases in viscosity when added to the polyester syrup. The present invention avoids this viscosity increase thereby allowing for sprayability through conventional spray-up equipment.

The unsaturated polyester resin syrup which is used in the composition of the present invention is prepared by combining an unsaturated polyester resin with a copolymerizable monomer which contains a terminal vinyl group. Unsaturated polyester resins are customarily fabricated from polyesterfication of polycarboxylic acids or polycarboxylic acid anhydrides and polyols, customarily glycols. One of the ingredients in the polyester contains ethylenic unsaturation, customarily the polycarboxylic acid. Typically, unsaturated polyester resins are fabricated from dicarboxylic acids such as phthalic acid, phthalic anhydride, adipic acid, succinic acid, tetrahydrophthalic acid or anhydride, tetrabromophthalic acid or anhydride, maleic acid or anhydride, fumaric acid. Typical glycols include ethylene glycol, propylene glycol, butylene glycol, neopentyl glycol, diethylene glycol, dipropylene glycol, polyethylene glycol, polypropylene glycol. Occasionally, trihydric and other polyols are included in the polyester such as trimethylol ethane, trimethylol propane, penta erythritol. Customarily a slight stoichiometric excess of glycol is employed in preparing the unsaturated polyester.

The copolymerizable monomers include styrene, alpha-methylstyrene, o-chlorostyrene, vinyl toluene, acrylic acid, methacrylic acid, alkyl acrylates, alkyl methacrylates, divinyl benzene, diacrylates, dimethacrylates, triacrylates, trimethacrylates, and the like. Customarily, the copolymerizable monomer is provided in an amount to constitute from about 10 to 50 percent of the unsaturated polyester resin syrup, i.e., the unsaturated polyester resin comprises about 90 to 50 percent of the resin syrup.

Typical initiators for the unsaturated polyester resin syrup include peroxy compounds such as benzoyl peroxide, cumene hydroperoxide, tertiary butyl peroxide and the like. Accelerators for the peroxy initiators include amines, cobalt naphthenate and cobalt octoate.

The polymerizable composition of the present invention is achieved by mixing about 20 percent to 50 percent by weight of the unsaturated polyester resin syrup with about 10 percent to 50 percent by weight of a reactive extender, and from about 10 percent to about 70 percent inorganic filler. At least 10 percent by weight of the mixture should be a group II metal carbonate with the remainder of the inorganic filler content, if used, including group II metal carbonate or other conventional inorganic fillers up to about a 70 percent by weight total filler content.

Generally, the reactive extender of the present invention is formed from a generally stoichiometric mixture of an aqueous alkali metal silicate and a water soluble unsaturated carboxylic acid. Such a mixture should have a pH within the range of 4 to 10 although preferably the pH will range from 5 to 10 and most preferably the pH is greater than 7 and less than 9. A stoichiometric mixture is preferred because an excess of either acid or silicate can adversely affect performance of the system. Free acid produces an odor and attacks the laminate. Free silicate in the mixture can yield a prohibitive viscosity increase when mixed with the polyester resin. Mixing at high shear is accomplished to break down the hydrous silica gel particles formed by the reaction of the alkali metal silicate with the carboxylic acid. Mixing of this intermediate solution is continued at a sufficiently high shear to reduce the hydrous silica gel particles to a sufficiently small size to pass an 80 mesh filter screen. Then a sufficient amount of a thickener is added to maintain the hydrous silica gel particles in suspension and achieve a viscosity suitable for spraying, of preferably about 200 centipoises. When mixed with the resin syrup and the inorganic filler, a secondary reaction occurs after a period of time between the hydrous silica gel particles of the mixture and the group II metal carbonate which is preferably calcium carbonate.

The alkali metal silicate is preferably sodium silicate, though potassium silicate will also work. The unsaturated carboxylic acid is preferably selected from the group consisting of acrylic acid, methacrylic acid and mixtures thereof. A surfactant, preferably ionic, may be added to both the aqueous alkali metal silicate solution and the water soluble carboxylic acid solution prior to mixing of the two in order to maintain a surface tension around 35 dynes per centimeter. The thickener added to maintain the hydrous silica gel particles in suspension is preferably guar gum dispersed in diethylene glycol, though other thickeners may be employed so long as no adverse effects are realized from their use.

Upon the mixing of the alkali metal silicate with the acrylic acid, methacrylic acid or mixtures thereof, an acrylate monomer is formed which, upon polymerization with an unsaturated polyester resin syrup, imparts a flexibility to the product during a portion of the cure cycle. Prior art compositions typically become brittle early in the cure cycle, often resulting in cracking, especially around sharp edges. In the present composition, the acrylate softening effect precludes this sudden rigidity while the slow secondary reaction between hydrous silica gel and the metal carbonate eventually hardens the product.

A primary advantage of the present extender is that it can be used in quantities comparable to that of the resin itself thereby greatly reducing cost as the extender is much less expensive than the resin. Additionally, reducing the amount of resin reduces the amount of styrene, one of the primary copolymerizable monomers employed in the production of the resin, and thus results in lower styrene emission during a sprayup operation. Presently, at least one state, California, regulates styrene emission, and it is likely that many other states will soon regulate the amount of volatile organic emissions in resins.

Additionally, the low resin syrup content of the final product increases its flame retardance. When exposed to fire, the product resists burning due to the low fuel (resin syrup) content. In this regard, it will be noted that the presence of chemically bound water in the hydrous silica gel particles additionally benefits the product by being capable of being released when exposed to heat. Even when burning occurs, the smoke level is low and the structural integrity of the product is maintained. A continuous region of non-combustible material is thus created which protects any material behind it from burning.

A further advantage of the present invention is the extension of the pull window for removing a moldable product from its mold. Although the cure cycle of an unsaturated polyester resin syrup in conjunction with the present extender is generally the same in length as that of a conventional resin syrup mixture, the pull window, that time after reaction exotherm and cool down during which a product being molded may be pulled from its mold without damage to the product, is extended from about a 10 to 45 minute window to a 7 to 8 hour window. It is the acrylate of the reactive extender which "opens" the pull window and the slowly formed product of the secondary reaction between hydrous silica gel and calcium or other metal carbonate which eventually "closes" it. Thus, a worker who is preparing a molded article such as a tub/shower stall has at least 7 hours in which to remove the article from its mold without danger of cracking or ruining the stall as opposed to, at best, the 45 minute window of the prior art. While, as noted above, the polyester cure cycle remains about the same, the overall cure cycle of the composition is lengthened by the secondary reaction. In fact, whereas conventional resin compositions reach virtually full cure within approximately 24 hours, compositions according to the present invention require up to several days depending upon ambient conditions.

Additionally, to the mixture of resin syrup and extender already discussed, there may be added up to about 70 percent by weight of a conventional filler. The composition must contain at least about 10 percent by weight of calcium carbonate or some other group II metal carbonate, but the remaining filler content may include one or more of the conventional fillers including aluminum trihydrate and calcium sulfate dihydrate as well as one or more of the metal carbonates.

Examples of the present invention will further illustrate its utility.

EXAMPLE 1

A reactive extender for use with an unsaturated polyester resin syrup containing reactive components that will react with the unsaturated polyester resin syrup and certain inorganic fillers was obtained as

| Mix I | | |
|---|---|---|
| 124 parts | 3.2 ratio sodium silicate |
| 100 parts | water |
| 3 parts | Triton N-101 (general purpose surfactant) |
| 0.2 parts | Dow Corning Antifoam B (general purpose silicone antifoam) | were combined and mixed well.
In a separate container:

| Mix II | | |
|---|---|---|
| 18 parts | acrylic acid |
| 24 parts | water |
| 1 part | Triton N-101 (general purpose surfactant) | were combined and mixed well.

Mix II was then added to Mix I slowly with very high shear mixing. The high shear mixing breaks up the hydrous silica gel particles as they are formed by the reaction of the acrylic acid with the sodium silicate. After all the Mix II was added, the high shear mixing was continued for such a time period as was necessary to reduce the hydrous silica gel particles to such a size as to pass an 80 mesh filter screen.

The pH of the mix was adjusted to 8.5–9.0. A suitable viscosity control mixture includes:

| Mix III | | |
|---|---|---|
| 2.0 parts | diethylene glycol |
| 0.125 parts | Jaguar HP-11 (guar gum) |

Mix III was then added to the product of Mix I and Mix II and blended well.

EXAMPLE 2

An unsaturated polyester resin syrup was produced from 30 parts by weight styrene and 70 parts by weight of a general purpose unsaturated polyester resin produced by conventional reaction of:

| 60 moles | phthalic anhydride, |
|---|---|
| 40 moles | maleic anhydride, and |
| 106 moles | propylene glycol | esterified to an acid number of about 20.

EXAMPLE 3

A sprayable system was prepared by assembling ingredients in the manner to be described:

| unsaturated polyester resin syrup (Example 2) | 80 parts |
|---|---|
| reactive extender (Example 1) | 20 parts |
| diethyl aniline | 0.1 parts |
| N,N-dimethyl-p-toluidine | 0.1 parts |
| $CaCO_3$ powder (−100 Mesh U.S. Standard Screen) | 100 parts |

The ingredients were mixed in order and blended until a smooth homogenous sprayable formulation was obtained.

One hundred (100) parts of the formulation described above was mixed well with two (2) parts of a 40% aqueous dispersion of benzoyl peroxide, ABCURE-S-40-25 produced by ABCO Industries, Roebuck, S.C. The mix was cast on a mylar film. After approximately 15 minutes the mixture was no longer fluid but had gelled. Temperature of the gel thereafter rose (exotherm) then cooled, yielding a hard, strong shape. The formulation exhibited the same general cure cycle as a conventional unsaturated polyester resin.

One hundred (100) parts of the formulation described above was mixed with two (2) parts of ABCURE-S-40-25, a 40% aqueous dispersion of benzoyl peroxide. The mix was cast on a mylar film. Two pieces of 1½ ounce chopped strand glass mat (4"×4") were placed on the liquid and worked into the liquid to form a continuous shape. After approximately 15 minutes, the mixture gelled. Thereafter, temperature rose due to exotherm of the cure followed by cool down in about one (1) hour. After cool down, a hard, strong laminate existed which could be handled without damage.

EXAMPLE 4

A sprayable system was prepared by assembling ingredients in the manner to be described:

| unsaturated polyester resin syrup (Example 2) | 50 parts |
|---|---|
| reactive extender (Example 1) | 50 parts |
| diethyl aniline | 0.1 parts |
| N,N-dimethyl-p-toluidine | 0.1 parts |
| $CaCO_3$ powder (−100 Mesh U.S. Standard Screen) | 100 parts |

The ingredients were mixed in order and blended until a smooth homogenous sprayable formulation was obtained.

One hundred (100) parts of the formulation described above was mixed with two (2) parts of ABCURE S-40-25, a 40% aqueous dispersion of benzoyl peroxide. The mix was cast on a mylar film. After approximately 10–11 minutes the mixture had gelled. Temperature of the gel then rose (exotherm) and cooled producing a hard strong shape. The formulation exhibited the same cure cycle as a conventional unsaturated polyester resin.

One hundred (100) parts of the formulation described above was mixed with two (2) parts of ABCURE S-40-25, a 40% aqueous dispersion of benzoyl peroxide. The mix was cast on a mylar film. Two pieces of 1½ ounce chopped strand glass mat (4"×4") were placed on the liquid and worked into the liquid to form a continuous shape. After approximately 10-11 minutes the mixture had gelled. The temperature then rose (exotherm) and cooled down after about one (1) hour, producing a hard, strong laminate which could be handled.

EXAMPLE 5

An unsaturated polyester resin syrup was produced from 30 parts by weight of styrene and 70 parts by weight of a general purpose unsaturated polyester resin produced by conventional reaction of:

| | |
|---|---|
| 60 moles | terephthalic anhydride, |
| 40 moles | maleic anhydride, |
| 53 moles | propylene glycol, and |
| 53 moles | ethylene glycol | esterified to an acid number of about 20.

EXAMPLE 6

A sprayable system was prepared by assembling ingredients in the manner to be described:

| | |
|---|---|
| unsaturated polyester resin syrup (Example 5) | 80 parts |
| reactive extender (Example 1) | 20 parts |
| diethyl aniline | 0.1 parts |
| N,N-dimethyl-p-toluidine | 0.1 parts |
| CaCO$_3$ powder (−100 Mesh U.S. Standard Screen) | 100 parts |

The ingredients were mixed in order and blended until a smooth homogenous sprayable formulation is obtained.

One hundred (100) grams of the formulation described above was mixed with two (2) parts of ABCURE S-40-25, an aqueous dispersion of benzoyl peroxide. The mix was cast on a mylar film. After approximately 14 minutes the mixture was no longer fluid and had gelled. The temperature rose (exotherm), then cooled producing a hard, strong shape. The formulation exhibited the same cure cycle as a conventional unsaturated polyester resin.

One hundred (100) parts of the formulation described above was mixed with two (2) parts of ABCURE S-40-25, a 40% aqueous dispersion of benzoyl peroxide. The mix was cast on a mylar film. Two pieces of 1½ ounce chopped strand glass mat (4"×4") were placed on the liquid and worked into the liquid to form a continuous shape. After approximately 14 minutes the mixture was no longer fluid, but had gelled. Temperature of the gel rose (exotherm) then cooled in about one (1) hour producing a hard, strong laminate which could be handled.

EXAMPLE 7

A sprayable system was prepared by assembling ingredients in the manner to be described:

| | |
|---|---|
| unsaturated polyester resin syrup (Example 5) | 50 parts |
| reactive extender (Example 1) | 50 parts |
| diethyl aniline | 0.1 parts |
| N,N-dimethyl-p-toluidine | 0.1 parts |
| CaCO$_3$ powder (−100 Mesh U.S. Standard Screen) | 100 parts |

The ingredients were mixed in order and blended until a smooth homogenous sprayable formulation is obtained.

One hundred (100) parts of the formulation described above was mixed with two (2) parts of ABCURE S-40-25, an aqueous dispersion of benzoyl peroxide. The mix was cast on a mylar film. After approximately 12 minutes the mixture was no longer fluid but had gelled. Temperature of the gel thereafter rose (exotherm) then cooled producing a hard, strong shape. The formulation exhibited the same cure cycle as a conventional unsaturated polyester resin.

One hundred (100) parts of the formulation described above was mixed with two (2) parts of ABCURE S-40-25, a 40% aqueous dispersion of benzoyl peroxide. The mix was cast on a mylar film. Two pieces of 1½ ounce chopped strand glass mat (4"×4") were placed on the liquid and worked into the liquid to form a continuous shape. After approximately 12 minutes the mixture was no longer fluid but had gelled. Temperature of the gel thereafter rose (exotherm) then cooled producing a hard, strong laminate which could be handled without damage.

EXAMPLE 8

A reactive extender for use with an unsaturated polyester resin syrup containing reactive components that will react with the unsaturated polyester resin syrup and certain inorganic fillers was obtained as follows:

| Mix I | | |
|---|---|---|
| 124 parts | | 3.2 ratio sodium silicate |
| 100 parts | | water |
| 3 parts | | Triton N-101 (general purpose surfactant) |
| 0.2 parts | | Dow Corning Antifoam B (general purpose silicone antifoam) | were combined and mixed well.

In a separate container:

| Mix II | | |
|---|---|---|
| 21.5 parts | | methacrylic acid |
| 24 parts | | water |
| 1 part | | Triton N-101 (general purpose surfactant) | were combined and mixed well.

Mix II was then added to Mix I slowly with very high shear mixing. The high shear mixing breaks up the hydrous silica gel particles as they are formed by the reaction of the acrylic acid with the sodium silicate.

After all of Mix II was added, the high shear mixing was continued for such a time period as was necessary to reduce the hydrous silica gel particles to such a size as to pass an 80 mesh filter screen.

The pH of the mix was adjusted to 8.5-9.0.

A viscosity control mixture was prepared which included:

| Mix III | |
|---|---|
| 0.2 parts | diethylene glycol |
| 0.125 parts | Jaguar HP11 (guar gum) |

Mix III was then added to the product of Mix I and Mix II and blended well.

EXAMPLE 9

A sprayable system was prepared by assembling ingredients in the manner to be described:

| | |
|---|---|
| unsaturated polyester resin syrup (Example 2) | 80 parts |
| reactive extender (Example 8) | 20 parts |
| diethyl aniline | 0.1 parts |
| N,N-dimethyl-p-toluidine | 0.1 parts |
| CaCO₃ powder (−100 Mesh U.S. Standard Screen) | 100 parts |

The ingredients were mixed in order and blended until a smooth homogenous sprayable formulation was obtained.

One hundred (100) parts of the formulation described above was mixed with two (2) parts ABCURE S-40-25, an aqueous dispersion of benzoyl peroxide. The mix was cast on a mylar film. After approximately 14 minutes the mixture was no longer fluid but had gelled. Temperature of the gel thereafter rose (exotherm) then cooled producing a hard, strong shape. The formulation exhibited the same cure cycle as a conventional unsaturated polyester resin.

One hundred (100) parts of the formulation described above was mixed with two (2) parts of ABCURE S-40-25, a 40% aqueous dispersion of benzoyl peroxide. The mix was cast on a mylar film. Two pieces of 1½ ounce chopped strand glass mat (4"×4") were placed on the liquid and worked into the liquid to form a continuous shape. After approximately 14 minutes the mixture was no longer fluid but had gelled. Temperature of the gel thereafter rose (exotherm) then cooled producing a hard, strong laminate which could be handled.

EXAMPLE 10

A sprayable system was prepared by assembling ingredients in the manner to be described:

| | |
|---|---|
| unsaturated polyester resin syrup (Example 2) | 50 parts |
| reactive extender (Example 8) | 50 parts |
| diethyl aniline | 0.1 parts |
| N,N-dimethyl-p-toluidine | 0.1 parts |
| CaCO₃ powder (−100 Mesh U.S. Standard Screen) | 100 parts |

The ingredients were mixed in order and blended until a smooth homogenous sprayable formulation was obtained.

One hundred (100) parts of the formulation described above was mixed with two (2) parts of ABCURE S-40-25, an aqueous dispersion of benzoyl peroxide. The mix was cast on a mylar film. After approximately 15 minutes the mixture was no longer fluid but had gelled. The temperature rose (exotherm) then cooled producing a hard, strong shape. The formulation exhibited the same cure cycle as a conventional unsaturated polyester resin.

One hundred (100) parts of the formulation described above was mixed with two (2) parts of ABCURE S-40-25, a 40% aqueous dispersion of benzoyl peroxide. The mix was cast on a mylar film. Two pieces of 1½ ounce chopped strand glass mat (4"×4") were placed on the liquid and worked into the liquid to form a continuous shape. After approximately 15 minutes the mixture was no longer fluid but had gelled. The temperature rose (exotherm) then cooled producing a hard, strong laminate which could be handled.

EXAMPLE 11

A sprayable system was prepared by assembling ingredients in the manner to be described:

| | |
|---|---|
| unsaturated polyester resin syrup (Example 5) | 80 parts |
| reactive extender (Example 8) | 20 parts |
| diethyl aniline | 0.1 parts |
| N,N-dimethyl-p-toluidine | 0.1 parts |
| CaCO₃ powder (−100 Mesh U.S. Standard Screen) | 100 parts |

The ingredients were mixed in order and blended until a smooth homogenous sprayable formulation was obtained.

One hundred (100) parts of the formulation described above was mixed with two (2) parts of ABCURE S-40-25, a 40% aqueous dispersion of benzoyl peroxide. The mix was cast on mylar film. After approximately 14 minutes the mixture was no longer fluid but had gelled. The temperature rose (exotherm) then cooled producing a hard, strong shape. The formulation exhibited the same cure cycle as a conventional unsaturated polyester resin.

One hundred (100) parts of the formulation described above was mixed with two (2) parts ABCURE S-40-25, an aqueous benzoyl peroxide dispersion. The mix was cast on a mylar film. Two pieces of 1½ ounce chopped strand glass mat (4"×4") were placed on the liquid and worked into the fluid to form a continuous shape. After approximately 14 minutes the mixture was no longer fluid but had gelled. The temperature rose (exotherm), then cooled producing a hard, strong laminate which could be handled.

EXAMPLE 12

A sprayable system was prepared by assembling ingredients in the manner to be described:

| | |
|---|---|
| unsaturated polyester resin syrup (Example 5) | 50 parts |
| reactive extender (Example 8) | 50 parts |
| diethyl aniline | 0.1 parts |
| N,N-dimethyl-p-toluidine | 0.1 parts |
| CaCO₃ powder (−100 Mesh U.S. Standard Screen) | 100 parts |

The ingredients were mixed in order and blended until a smooth homogenous sprayable formulation was obtained.

One hundred (100) parts of the formulation described above was mixed with two (2) parts ABCURE S-40-25, an aqueous benzoyl peroxide dispersion. The mix was cast on a mylar film. After approximately 15 minutes the mixture was no longer fluid but had gelled. The temperature rose (exotherm) then cooled producing a hard, strong shape. The formulation exhibited the same cure cycle as a conventional unsaturated polyester resin.

One hundred (100) parts of the formulation described above was mixed with two (2) parts ABCURE S-40-25, a 40% aqueous benzoyl peroxide dispersion. The mix was cast on a mylar film. Two pieces of 1½ ounce chopped strand glass mat (4"×4") were placed on the liquid and worked into the liquid to form a continuous shape. After approximately 15 minutes the mixture was no longer fluid but had gelled. The temperature rose (exotherm), then cooled producing a hard, strong laminate which could be handled.

EXAMPLE 13

A resin formulation as described in Example 2 and sprayable formulation of Example 3 were used in the manufacture of combined tub and shower stall units.

Twenty (20) units were prepared in standard commercial molds for tub, shower units according to the following procedure. A commercial gel coat (a polyester resin which cures to form a hard, high gloss outer finish for the product) was applied to the relevant mold surfaces to a thickness of approximately 18-20 mils, and permitted to cure. Thereafter the formulation according to the present invention was simultaneously sprayed with 2 percent by weight of ABCURE S-40-25 catalyst from dual nozzles onto the gel coat surface to a thickness of about 40-60 mils. Spraying was achieved by a standard commercial spray-up unit manufactured by Magnum Industries, Clearwater, Fla. and was followed by rolling out to produce a smooth surface. The spray formulation had been mixed with a Cowles mixer and exhibited a mix temperature of 90° F. Gelling occurred after approximately eight (8) minutes, followed by a peak exotherm temperature of 211° F. with a gel to peak exotherm interval of about eight and one-half (8½) minutes.

A second layer of formulation catalyst according to the present invention was then sprayed onto the gelled first layer as described above to a thickness of approximately 40-60 mils, after which standard chopped fiberglass roving was sprayed onto the formulation and the formulation was rolled to form a smooth surface. The second layer of formulation then partially cured as noted above.

A number of the tub/shower units were pulled from the molds 45 minutes to one hour after application of the reinforced formulation according to the present invention. None were damaged by the pull out, and though not yet fully cured, all passed standard tests for acceptability for use and were approved. Likewise, a number of the tub/shower units were permitted to remain in the molds overnight. The next morning these units were pulled from their molds without any difficulty and showed no damage. All of these later pulled units also were approved for use after standard testing.

In one test to determine acceptability, hardness is measured by a Barcole hardness tester. Barcole tests indicate readings from 0-100, with a measurement of greater than 25 indicating minimal acceptable hardness, and a measurement in a range of about 40-45 indicating a well cured resin. The units produced according to this experiment measured 10-20 during the first 24 hours and around 40 after about two days, whereas conventional units harden much faster. Thereafter, the units were further tested until seven days old. Once the units peaked at about 40-45 in the second to third day, no further hardening was detected.

The above example demonstrates that formulations according to the present invention achieve partial cure in about the same time as conventional polyester resin systems, yet permit the product to be pulled from the mold without damage over a longer period of time, after which the secondary reaction slowly hardens the product to a conventional level of hardness.

EXAMPLE 14

Using a sprayable formulation according to Example 6, further tub/shower stalls were produced as set forth in Example 13. Generally like successful results were obtained.

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitative of the invention so further described in such appended claims.

That which is claimed is:

1. A polymerizable composition comprising:
    a) about 20% to 50% weight of a polyester composition capable of free radical polymerization;
    b) about 10% to 50% by weight of a reactive extender comprising a mixture of:
        1) the reaction product of a generally stoichiometric mixture of an aqueous alkali metal silicate and a water soluble unsaturated carboxylic acid the reaction product having a pH within a range of about 4 to 10; and
        2) a sufficient amount of thickness to stablize the mixture; and
    c) at least about 10% by weight of a group II metal carbonate filler.

2. The composition set forth in claim 1 further comprising additional inorganic filler in an amount such that the group II metal carbonate filler and the additional inorganic filler total less than about 70% by weight of the composition.

3. The composition set forth in claim 1 wherein said substituent capable of free radical polymerization is an unsaturated polyester resin.

4. The composition set forth in claim 1 wherein the aqueous alkali metal silicate is aqueous sodium silicate.

5. The composition set forth in claim 1 wherein the water soluble unsaturated carboxylic acid is selected from the group consisting of acrylic acid, methacrylic acid and mixtures thereof.

6. The composition set forth in claim 1 wherein the pH of said mixture is within the range of about 7 to 9.

7. The composition set forth in claim 1 wherein the group II metal carbonate filler is calcium carbonate.

8. An improved sprayable, polymerizable molding composition comprising
    a) from about 20 to about 50 weight percent of an unsaturated polyester resin syrup;
    b) from about 20 to about 50 weight percent of a reactive extender for said polyester resin, said extender comprising a reaction product of a stoichiometric mixture of a sodium silicate solution and a water soluble unsaturated carboxylic acid solution, said extender having a pH in a range of from about 4 to about 10 and including a thickener; and
    c) from about 10 to about 70 weight percent of inorganic filler, at least 10 weight percent of which is a group II metal carbonate.

9. An improved composition as defined in claim 8 wherein the unsaturated carboxylic acid is selected from acrylic acid, methacrylic acid and mixtures thereof.

10. An improved composition as defined in claim 8 wherein the thickness is a dispersion of guar gum and viscosity of the composition is around 200 centipoises.

11. An improved composition as defined in claim 8 wherein the group II metal carbonate is calcium carbonate.

12. An improved composition as defined in claim 11 comprising further a polymerization catalyst adequate to initiate polymerization of the unsaturated polyester resin.

* * * * *